United States Patent [19]

Magrane

[11] Patent Number: 4,893,284

[45] Date of Patent: Jan. 9, 1989

[54] CALIBRATION OF PHASED ARRAY ULTRASOUND PROBE

[75] Inventor: Mark G. Magrane, Redmond, Wash.

[73] Assignee: General Electric Company, Milwaukee, Wis.

[21] Appl. No.: 199,893

[22] Filed: May 27, 1988

[51] Int. Cl.⁴ ............................................ H04B 11/00
[52] U.S. Cl. ..................................... 367/12; 367/138; 367/13
[58] Field of Search ....................... 367/13, 190, 7, 11, 367/12, 103, 105, 135, 138, 905; 73/1 DV, 609; 128/660.01

[56] References Cited

U.S. PATENT DOCUMENTS

| | | | |
|---|---|---|---|
| 4,173,749 | 11/1979 | Corkhill | 367/190 |
| 4,356,731 | 11/1982 | Mahony | 73/900 |
| 4,611,304 | 9/1986 | Butenko et al. | 364/571 |
| 4,686,655 | 8/1987 | Hyatt | 367/59 |

Primary Examiner—Thomas H. Tarcza
Assistant Examiner—Daniel T. Pihulic
Attorney, Agent, or Firm—James O. Skarsten; Douglas E. Stoner

[57] ABSTRACT

The dynamic range of ultrasound images is extended by providing compensation of errors inherent in the manufacturing process of medical ultrasound phased array probes. Time delay errors are predetermined and stored in a memory associated with each probe. A system then reads the values needed to perform error compensation directly from the particular probe being used.

9 Claims, 2 Drawing Sheets

CALIBRATION OF PHASED ARRAY ULTRASOUND PROBE

BACKGROUND OF THE INVENTION

The present invention relates in general to phased array ultrasound imaging, and more specifically to a phased array ultrasound probe with increased dynamic range.

Ultrasound imaging systems transmit ultrasonic waves into a volume to be imaged and receive ultrasonic waves therefrom. The reflected ultrasonic waves are converted to electrical signals which are then processed for use in controlling a video display. In an electronically steered sector scanner, ultrasonic waves are transmitted and received from multiple transducer elements, separately excited and arranged in an array on a probe. Types of electronically steered probes include linear arrays, two-dimensional arrays, curved phased arrays, and annular phased arrays, which will be collectively referred to as phased arrays.

Phased array scanners form images using electronic focusing to direct ultrasonic energy along a line (i.e., vector angle) and to receive echoes from the line. Focusing is achieved by selectively delaying signals during transmission and during reception by respective transducer elements in the phased array. Thus, signals along the vector angle exhibit constructive interference and signals from other locations exhibit destructive interference.

The ultrasound beam is steered along various vector angles by selectively delaying the signals according to the differences in path length between each transducer element and the various points on the beam line. Each transducer is typically connected to a respective controlled delay element. On reception, the output signals from the delay elements are coherently summed to provide an echo signal.

The time delay introduced by each delay element is determined by a controller, typically a computer or microprocessor. Many different schemes have been used to implement the needed signal delays. U.S. Pat. No. 4,285,011, issued to Sato, provides an example wherein analog switches connected to the taps of many delay lines are controlled by a CPU.

Due to physical manufacturing limitations, the transducer elements of an array have their own inherent time delays that vary from element to element. These variable delays modify the relative physical delay applied to a channel of the array such that the actual delay varies from the theoretical delay. Therefore, an image reconstructed from the delayed signals exhibits reduced dynamic range.

Because of the nature of transducer materials, it is not practical to isolate the cause of delay errors to any particular electrical or mechanical parameters. Thus, it has not been possible to eliminate delay errors by improving manufacturing techniques.

Accordingly, it is a principal object of the invention to improve the dynamic range of phased array ultrasound systems.

It is another object of the invention to provide a method and apparatus for removing signal delay errors caused by the transducer characteristics.

SUMMARY OF THE INVENTION

These and other objects are achieved in a phased array transducer probe assembly including a plurality of transducers arranged in an array. A memory means stores values corresponding to time delay errors inherent in the transducers. An assembly means carries the transducers and the memory means. A conductor means is coupled to the transducers and the memory means and is carried by the assembly means, thus permitting the transducers and memory means to be connected to an ultrasound system. Preferably, the stored values represent a time delay error for each respective transducer relative to the delay error of one predetermined transducer, such as the transducer with the most negative error.

BRIEF DESCRIPTION OF THE DRAWINGS

The novel features of the invention are set forth with particularity in the appended claims. The invention itself, however, both as to its organization and method of operation, together with further objects and advantages thereof, may best be understood by reference to the following description taken in conjunction with the accompanying drawings in which:

DETAILED DESCRIPTION OF PREFERRED EMBODIMENTS

Figure 1:
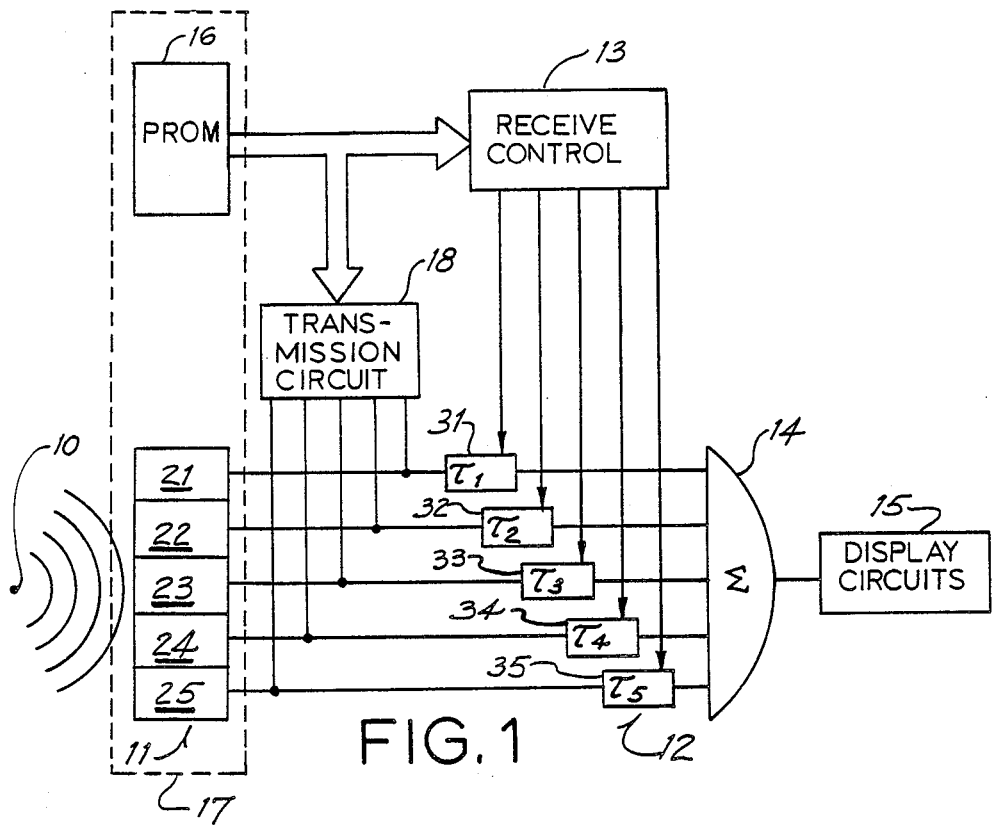
FIG. 1 is a block diagram depicting a linear phased array ultrasound system of the invention.

FIG. 1 shows a phased array ultrasound system including the improvement of the present invention. The system includes an array of transducers 11 in a housing 17. Transducers 11 are arranged in a linear array having only five transducer elements to simplify the drawing. A reception circuit including a corresponding array of controlled delay elements 12, a receive control 13 and a summing circuit 14 is connected to transducer array 11. Summing circuit 14 is connected to an image generator and display 15. Housing 17 typically comprises part of a detachable probe, while the reception circuit is contained within a system console.

Transducer array 11 includes individual transducers 21-25 which are respectively connected to individual delay elements 31-35 in delay element array 12. Each delay element 31-35 is individually connected to control 13 for receiving a delay time which corresponds to a particular vector angle.

Also contained in the system console is a transmission circuit 18 which preferably includes a transmit control, transmit delay elements, and individual pulsers for connecting to each transducer element 21-25 of array 11. Alternatively, transmission circuit 1B could be connected to share delay elements 31-35 with the reception circuit. During transmission, each element is excited by a corresponding pulser in a predetermined time relationship to provide transmission along a particular vector angle.

Figure 2:
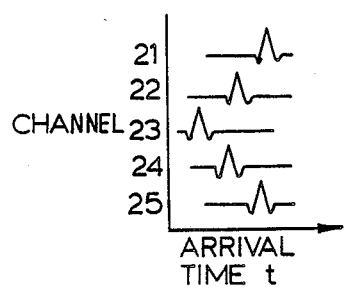
FIGS. 2-6 are graphical depictions of various waveforms associated with the system of FIG. 1.
Figure 3:
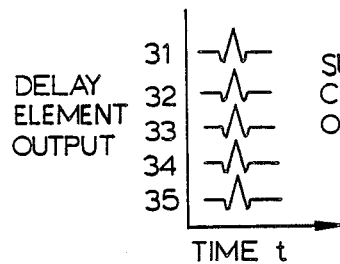

To demonstrate the operation of the system thus far described, reception of ultrasonic energy from a point source 10 will be described. The relative time of arrival of the peak of the signal radiating from point 10 varies with the path distance between each individual transducer element 21-25 and point 10. The different arrival times are illustrated in FIG. 2. Delay elements 31-35 compensate for the path length differences, theoretically resulting in a time alignment of all channel signals input to summing circuit 14 as is shown in FIG. 3. The summation of all the separate channel signals results in the signal shown in FIG. 4 which has maximum amplitude and minimum pulse length due to the in-phase summation of signals from all channels.

Figure 5:
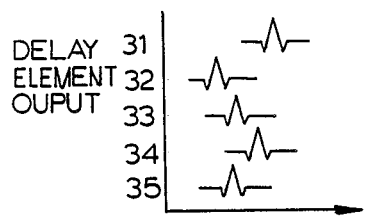
Figure 6:
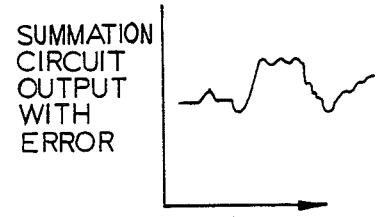

Due to the inherent time delay errors in individual transducers 21-25, the actual relative time arrival of signals to summing circuit 14 is as shown in FIG. 5. The resulting signal after summation has a much degraded waveform as is shown in FIG. 6. The final image constructed from such degraded signals will show a degraded dynamic range. Thus, in the prior art system, constructive interference has not been substantially accomplished while destructive interference (rejection of signals) from off-vector targets is less than optimal, resulting in less than optimal signal-to-noise.

Figure 4:
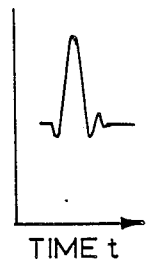

According to the present invention, the inherent time delay errors of the individual transducers of an array can be corrected, so as to obtain waveforms as shown in FIGS. 3 and 4 on reception (and to obtain a desired beam on transmission), by determining a delay error for each individual channel and then compensating for that error in programming the time delays in a scanning system. Thus, FIG. 1 further includes a memory 16 located in housing 17 which stores values corresponding to the time delay errors inherent in the transducers. Memory 16 is connected to receive control 13 and to transmission circuit 1B. After control 13 or transmission circuit 1B determines a theoretical delay for a respective transducer on transmit or receive, it obtains a predetermined delay error correction value from memory 16 and adds the correction value to the theoretical delay. Alternatively, all values from memory 16 can be initially transferred to memory internal to receive control 13 or transmission circuit 1B for use in later calculations. Preferably, the values stored in memory 16 have been normalized to the inherent delay error of a particular transducer such as the transducer at the center of the array, (i.e., transducer 23) or to the transducer with the most negative or smallest delay error.

Figure 7:
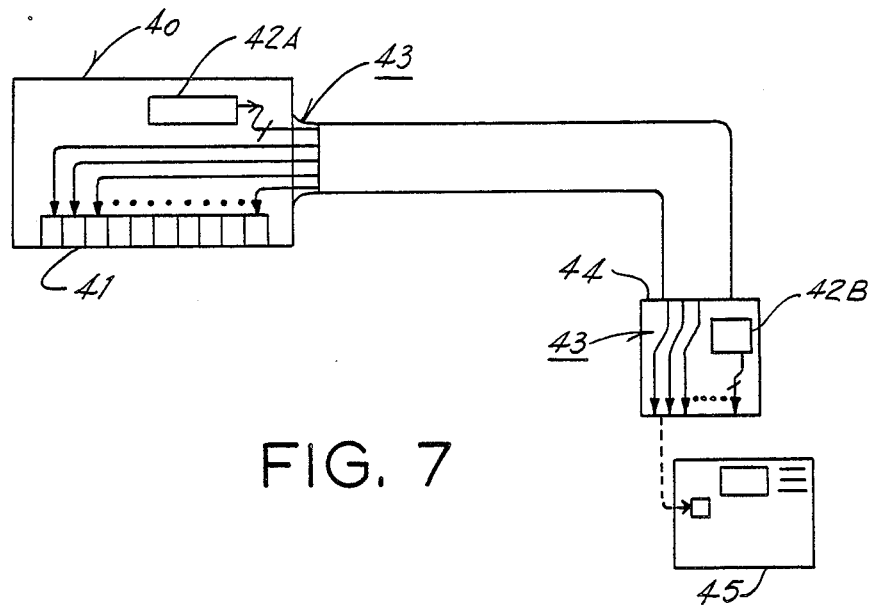
FIG. 7 illustrates a completed probe assembly of the invention connected to an ultrasound system.

A preferred embodiment of a transducer probe according to the invention is shown in FIG. 7. The probe includes a handle 40 which carries an array of transducer elements 41. The delay error memory can be contained within handle 40 as shown at 42A or may be carried remotely from the handle in another portion of the probe assembly such as at 42B on a probe connector end 44. A set of conductors 43 connects transducer array 41 and memory 42A or 42B to an ultrasound system 45 including a system console and a monitor. Many different probes are typically used with any single ultrasound system, each probe having its own delay errors. In the configuration shown in FIG. 7, after a particular probe assembly is connected to an imaging system, the controller (i.e., system computer) reads the values from the memory and will subsequently modify each theoretical time delay by the delay error correction value for each individual transducer. In the most preferred embodiment, memory 42 is comprised of a Programmable Read-Only Memory (PROM).

A preferred method for determining relative time delay errors for an array will be described with reference to FIG. 8. This method is similar to techniques described in co-pending U.S. applications Ser. No. 099,422; filed Sept. 21, 1987 and Ser. No. 132,097; filed Dec. 11, 1987, assigned to the assignee of the present application and hereby incorporated by reference.

Transducer array 41 is placed in a water-filled tank 50 with its face aligned parallel to an optically flat target 51 also positioned in watertank 50 and at a distance substantially equal to the nominal focal depth of array 41. The following procedure is then used to determine the time delay error for each element relative to the time delay error of a chosen transducer element, in this case the center element.

Figure 8:
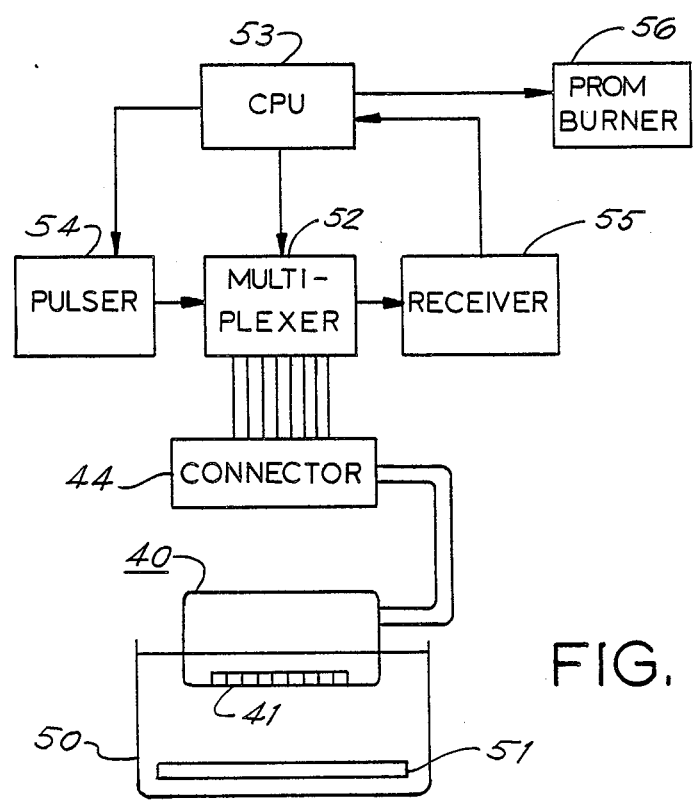
FIG. 8 illustrates apparatus for determining the inherent time delay errors of a transducer array.

Probe connector 44 is connected to a multiplexer 52 as shown in FIG. 8. Under control of a data acquisition CPU 53, respective elements are selected for connection to a pulser 54 and a receiver 55. At a specific reference time To, the pulser is fired to generate an acoustic wave from a transducer element n. The acoustic wave travels to and from the flat target in a fixed time period $2R/v$, where R is the distance from the surface of array 41 to target 51 and v is the velocity of sound in the tank medium (e.g., water). This fixed time period is constant for all array elements. However, due to fabrication variations, each transducer element exhibits an additional time delay $\epsilon_n$ which varies from element to element.

Next, the time delay error relative to a particular element (e.g., the center element) is determined for a respective element by comparing the echo waveform of the element under consideration with the echo waveform of the particular (center) element using cross correlation. Thus, the center element waveform is shifted in time relative to that of the transducer element being considered and a cross correlation coefficient is calculated at each shift point. The delay error for the particular element is the amount by which the center element waveform is shifted at the point of the maximum correlation coefficient. For example, a positive value for the amount of time shift indicates that the echo at a particular element arrived after the echo at the center element while a negative value indicates that it arrived before the center channel echo.

Data acquisition CPU 53 preferably normalizes all of the time delay values c n so that all of the correction values are greater than or equal to zero, in order to avoid a condition where the sum of a theoretical delay and the correction value is negative (i.e., attempting to go backwards in time). Preferably, the most negative delay error (or the smallest positive delay error if none are negative) is set to zero and all other values are given relative to that. CPU 53 then transmits a delay correction map to a PROM burner 56 for storage in a PROM which is to be mounted in the probe handle 17 or connector 44, for example.

Using the time delay error correction values determined above, an ultrasound beam can be transmitted and received with greater dynamic range and signal-to-noise.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed is:

1. A transducer probe assembly comprising:
  a plurality of ultrasonic transducers arranged in an array;

means for storing correction values corresponding to time delay errors inherent in said transducers;

assembly means for carrying said transducers and said correction means; and conductor means coupled to said transducers and said correction value storing means and carried by said assembly means for permitting said transducers and said correction value storing means to be electrically connected to an ultrasound system.

2. The assembly of claim 1 wherein said memory means is comprised of a programmable read-only memory.

3. The assembly of claim 1 wherein said values represent a time delay error relative to the delay error of a predetermined transducer.

4. The assembly of claim 1 wherein said array is a linear phased array.

5. An ultrasound system comprising: a plurality of transducers arranged in an array;

means for storing values for correcting time delay errors inherent in said transducers;

computer means for controlling transmission and reception by said transducers; and connector means for connecting said transducers and said correction value storing means to said computer means and for passing electrical signals therethrough.

6. The system of claim 5 further comprising:
probe assembly means for incorporating said transducers, said memory means and said connection means.

7. A method of operating an ultrasound phased array system, said system including an array of transducer elements and respective delay elements, said method comprising the steps of:

determining a theoretical delay for a respective transducer element according to a desired scanning vector angle of an ultrasound beam relative to said array;

obtaining a predetermined delay error correction value corresponding to said respective transducer element prior to system operation;

storing said correction value in a memory; and changing said theoretical delay by a value equal to said correction value to obtain a corrected delay.

8. The method of claim 7 wherein said value represents a time delay error inherent in said respective transducer relative to a time delay error inherent in a predetermined transducer element.

9. The method of claim 7 further comprising the steps of:

transmitting an acoustic wave from said array, said wave being formed according to said corrected delay; and receiving an acoustic wave arriving at said array, said wave being detected according to said corrected delay.

* * * * *

UNITED STATES PATENT AND TRADEMARK OFFICE
CERTIFICATE OF CORRECTION

PATENT NO. : 4,893,284
DATED : Jan. 9, 1990
INVENTOR(S) : Mark G. Magrane

It is certified that error appears in the above-identified patent and that said Letters Patent is hereby corrected as shown below:

Col. 5, line 4, after "correction" insert --value storing--.

Col. 2, line 56, change "1B" to --18--.

Col. 3, lines 30, 31 and 37, change "1B" to --18--.

Col. 4, line 42, change "c n" to -- $\sum_n$ --.

Col. 5, line 2, delete the "." after "delay"

Signed and Sealed this

Twenty-fifth Day of August, 1992

*Attest:*

DOUGLAS B. COMER

*Attesting Officer*    *Acting Commissioner of Patents and Trademarks*